(12) United States Patent
Woo et al.

(10) Patent No.: US 6,644,589 B2
(45) Date of Patent: *Nov. 11, 2003

(54) COMPRESSED AIR ENGINE AND FLYING OBJECT EQUIPPED THEREWITH

(75) Inventors: Jong Bok Woo, Gangwon-do (KR); Ja Kook Koo, Chungchungbuk-do (KR); Kwang Joon Yoon, Seoul (KR); Yun Je Kim, Seoul (KR)

(73) Assignee: Aerovadinci Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/338,372

(22) Filed: Jan. 8, 2003

(65) Prior Publication Data

US 2003/0094538 A1 May 22, 2003

Related U.S. Application Data

(63) Continuation of application No. 10/167,728, filed on Jun. 11, 2002, now Pat. No. 6,530,541.

(30) Foreign Application Priority Data

Nov. 7, 2001 (KR) .......................................... 2001-63263

(51) Int. Cl.[7] ............................................... B64C 33/00
(52) U.S. Cl. ............................. 244/11; 244/22; 244/72; 446/35
(58) Field of Search ............................. 244/11, 22, 72; 446/35

(56) References Cited

U.S. PATENT DOCUMENTS

| 5,163,861 A | 11/1992 | Van Ruymbeke ............ 446/35 |
| 6,006,517 A | 12/1999 | Kownacki et al. ............ 60/370 |
| 6,530,541 B1 * | 3/2003 | Woo et al. ..................... 244/11 |

FOREIGN PATENT DOCUMENTS

WO    WO 02/10014 A1    2/2002

* cited by examiner

*Primary Examiner*—J. Woodrow Eldred
(74) *Attorney, Agent, or Firm*—Woodcock Washburn LLP

(57) ABSTRACT

A compressed air engine and a flying object using the engine are disclosed. The flying object includes the following elements. That is, the compressed air engine includes: a top member 11 provided with an air inlet 16; an upper cylinder 12; a lower cylinder 13; a bottom member 14; an air pipe, for passing of a compressed air; a shuttle 20 for performing up/down movements within a cylinder formed by the upper and lower cylinders; and a pair of pistons 21a and 21b over and under the shuttle respectively. The pair of the wings are symmetrically and pivotally assembled to the shuttle and the lower cylinder through securing shafts so as to perform up/down movements in accordance with the up/down movements of the shuttle. A compressed air container 2 is assembled to the bottom of the bottom member, for storing the compressed air.

2 Claims, 14 Drawing Sheets

COMPRESSED AIR ENGINE AND FLYING OBJECT EQUIPPED THEREWITH

This application is a continuation of 10/167,728 filed Jun. 11, 2002, now U.S. Pat. No. 6,530,541 B1 issued Mar. 11, 2003 which claims priority of Application No. 2001-69263 filed Nov. 7, 2001 in Korea, the entirety of which is incorporated herein by reference.

FIELD OF THE INVENTION

The present invention relates to a compressed air engine and a flying object equipped with the air engine, in which a compressed air is injected into a compressed air container, and the compressed air is discharged to operate the engine by the force of the compressed air. More specifically, the present invention relates to a compressed air engine and a flying object equipped with the air engine, in which a compressed air is injected into a compressed air container, and the compressed air is discharged at a certain discharge rate, so that the discharging air would drive the compressed air engine. A pair of wings which are assembled to the compressed air engine are made flapped, and thus, lifting and propulsion forces are generated.

BACKGROUND OF THE INVENTION

Model planes are a kind of most popular sports articles for adults as well as for children. So far, many kinds of model planes have been manufactured for being used as toys, as sports articles and as recreation articles.

The model planes that have been manufactured so far can be classified into: those having no power-driving means; and those having a power-driving means. The model planes that are provided with the power-driving means include: propeller planes, jet planes, and helicopters with helical wings. They are usually controlled with a radio controller.

The present inventors have been making efforts to get rid of the conception of the conventional model planes to develop a flying object resorting to the flapping motions of wings like birds and insects.

The present inventor utilized the principle that insects and birds fly by the flapping motions of their wings. Thus, a compressed air was injected into a compressed air container to a certain level of pressure, and then, the compressed air was discharged out of the compressed air container, so that a compressed air engine can be operated by the discharge force of the compressed air. Thus two pairs of wings which were assembled to the compressed air engine were made perform the flapping motions, thereby generating lifting and propulsion forces. This was filed for a patent application under Korean Patent Application No. 2000-43618 (filed on Jul. 28, 2000), and based on this, a PCT application was filed under PCT Application No. PCT/KR01/00932 (field on Jun. 1, 2001).

The present inventor improved the above PCT application to develop a compressed air engine and a flying object equipped with the engine, in which only one pair of wings are provided.

OBJECT OF THE INVENTION

It is an object of the present invention to provide a compressed air engine in which a compressed air is injected into a compressed air container, and the compressed air is discharged at a certain discharge rate to generate a propulsion force, thereby making it possible to fly.

It is another object of the present invention to provide a flying object in which a compressed air is injected into a compressed air container, and the compressed air is discharged at a certain discharge rate to make a pair of wings perform flapping motions, thereby making it possible to fly.

It is still another object of the present invention to provide a flying object in which a compressed air container and a pair of wings are assembled to the compressed air engine in a simple manner, and if needed, a head part is assembled also in a simple manner, thereby making it possible to use it in a simple manner.

It is still another object of the present invention to provide a flying object in which a portable pump is used to inject the compressed air, thereby making it possible to fly in a simple manner.

It is still another object of the present invention to provide a flying object in which the pair of the wings assembled to the compressed air engine are made flap up and down to generate a propulsion force, thereby making it possible to fly.

It is still another object of the present invention to provide a flying object in which the pair of the wings assembled to the compressed air engine are made flap up and down and perform twisting motions within an angular range of about 15°.

The above objects and other objects are achieved by the present invention which is described in detail below.

SUMMARY OF THE INVENTION

In achieving the above objects, the flying object according to the present invention includes: a compressed air engine, the compressed air engine including: a top member 11 provided with an air inlet 16; an upper cylinder 12 assembled to the top member; a lower cylinder 13 assembled to the upper cylinder; a bottom member 14 assembled to the lower cylinder; an air pipe 15 connected between the top member and the bottom member, for passing of a compressed air; a shuttle 20 for performing up/down movements within a cylinder (consisting of the upper and lower cylinders) so as to make a pair of wings perform flapping motions; and a pair of pistons 21a and 21b for performing reciprocating movements over and under the shuttle respectively;

the pair of the wings being symmetrically and pivotally assembled to the shuttle through securing shafts so as to perform up/down movements in accordance with the up/down movements of the shuttle; and a compressed air container 2 assembled to the bottom of the bottom member, for storing the compressed air.

In the flying object of the present invention, a compressed air is injected into the compressed air container to a certain level of pressure by using a pump, and the compressed air is discharged out of the compressed air container at a certain discharge rate, so that the upper and lower pistons 21a and 21b can drive the shuttle 20 up and down so as to make the pair of the wings of the shuttle 20 flap up and down, thereby generating propulsion forces.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

The flying object according to the present invention includes: a compressed air engine 1; a compressed air container 2 assembled to the bottom of the engine body, for storing the compressed air; and a pair of wings 3a and 3b assembled to sides of the engine body, for performing the flapping motions.

Figure 1:
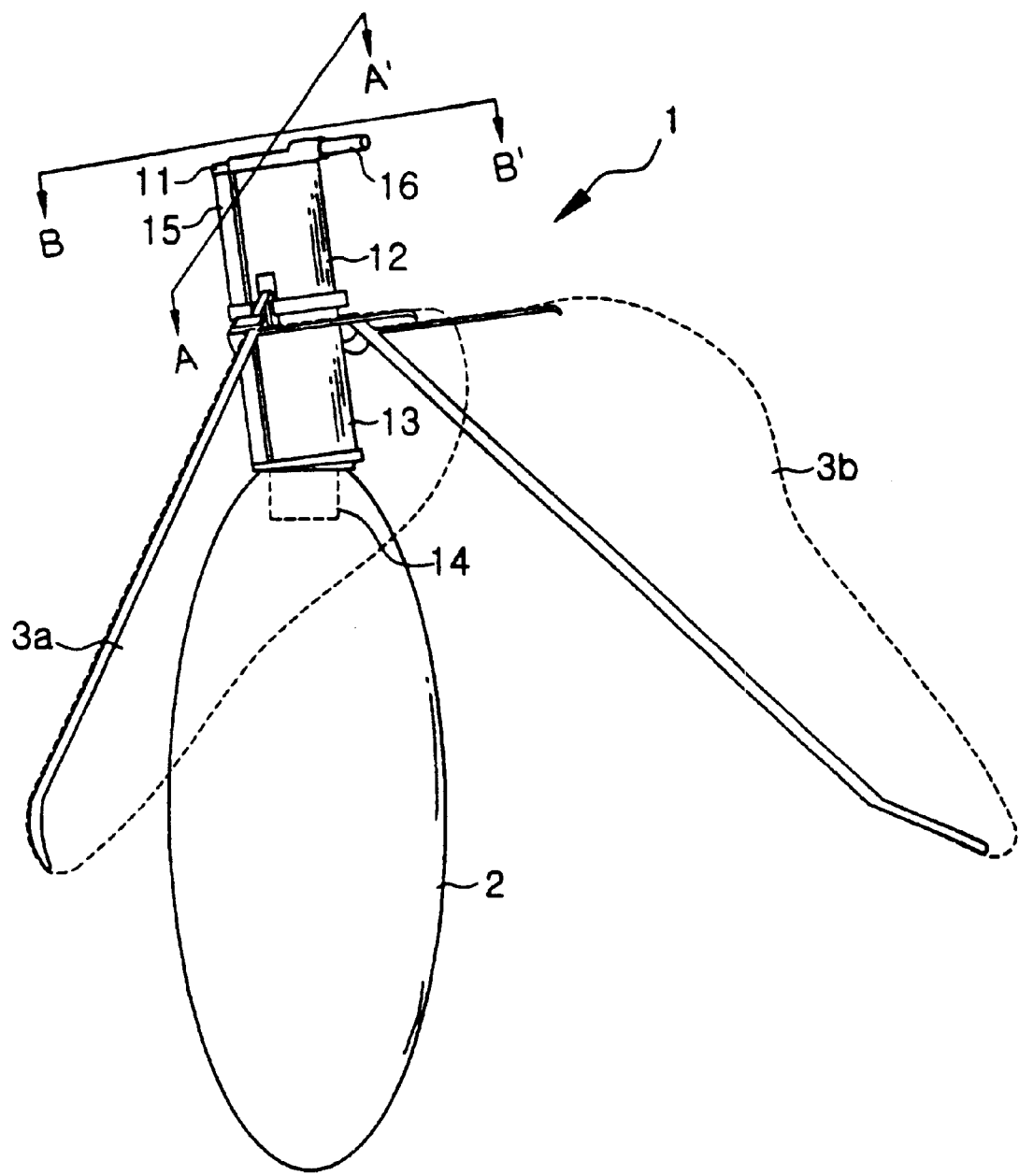
FIG. 1 is a perspective view of the flying object of the present invention, in which a compressed air container is assembled to the bottom of the compressed air engine, and a pair of wings are assembled to the middle of it, the pair of the wings being at a lowered position here.
Figure 2:
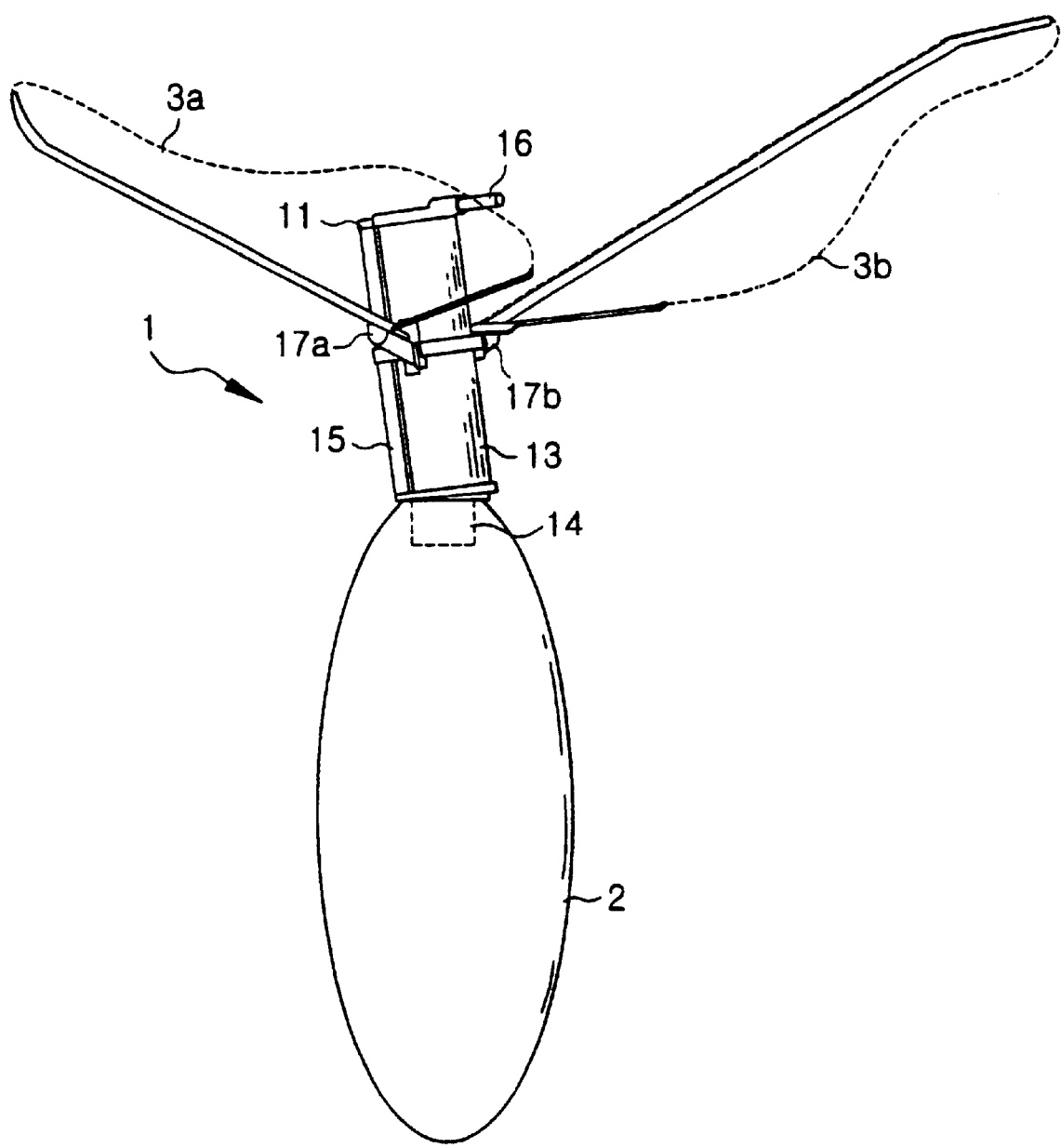
FIG. 2 is a schematic perspective view of the flying object in which the pair of the wings are at the lifted position.

FIG. 1 is a perspective view of the flying object of the present invention, in which a compressed air container is assembled to the bottom of the compressed air engine, and a pair of wings are assembled to the middle of it, the pair of the wings being at a lowered position here. FIG. 2 is a schematic perspective view of the flying object in which the pair of the wings are at the lifted position.

The compressed air engine 1 includes: a top member 11 provided with an air inlet 16; an upper cylinder 12 assembled to the top member; a lower cylinder 13 assembled to the upper cylinder; a bottom member 14 assembled to the lower cylinder; and an air pipe 15 connected between the top member and the bottom member, for passing of a compressed air.

Within the interior of the engine body, there are accommodated a shuttle and two pistons. When these internal elements perform up/down movements, the pair of the wings perform the flapping motions. These motions are generated when the compressed air is discharged. That is, when the compressed air which has been stored within the compressed air container is discharged at a certain discharge rate, the shuttle and the pistons perform the up/down movements, and accordingly, the pair of the wings 3a and 3b perform the flapping motions.

The compressed air is injected through the air inlet 16 into the compressed air container 2 by using a pump or the like.

That is, the compressed air which is injected by the pump (not illustrated) passes through the top member 11, the air pipe 15 and the bottom member 14 before being stored in the compressed air container 2. After being stored within the compressed air container 2, the compressed air is discharged out to drive the shuttle and the pistons.

The head part of FIGS. 1 and 2 consists of a cap having the form of a dragonfly, an airplane, a doll or the like, thereby completing a product. Here, however, they are neither illustrated nor described, but only the structure and principle of the compressed air engine will be described. The cap of the head part can take various forms, but this can be easily carried out by those ordinarily skilled in the art.

Figure 3:
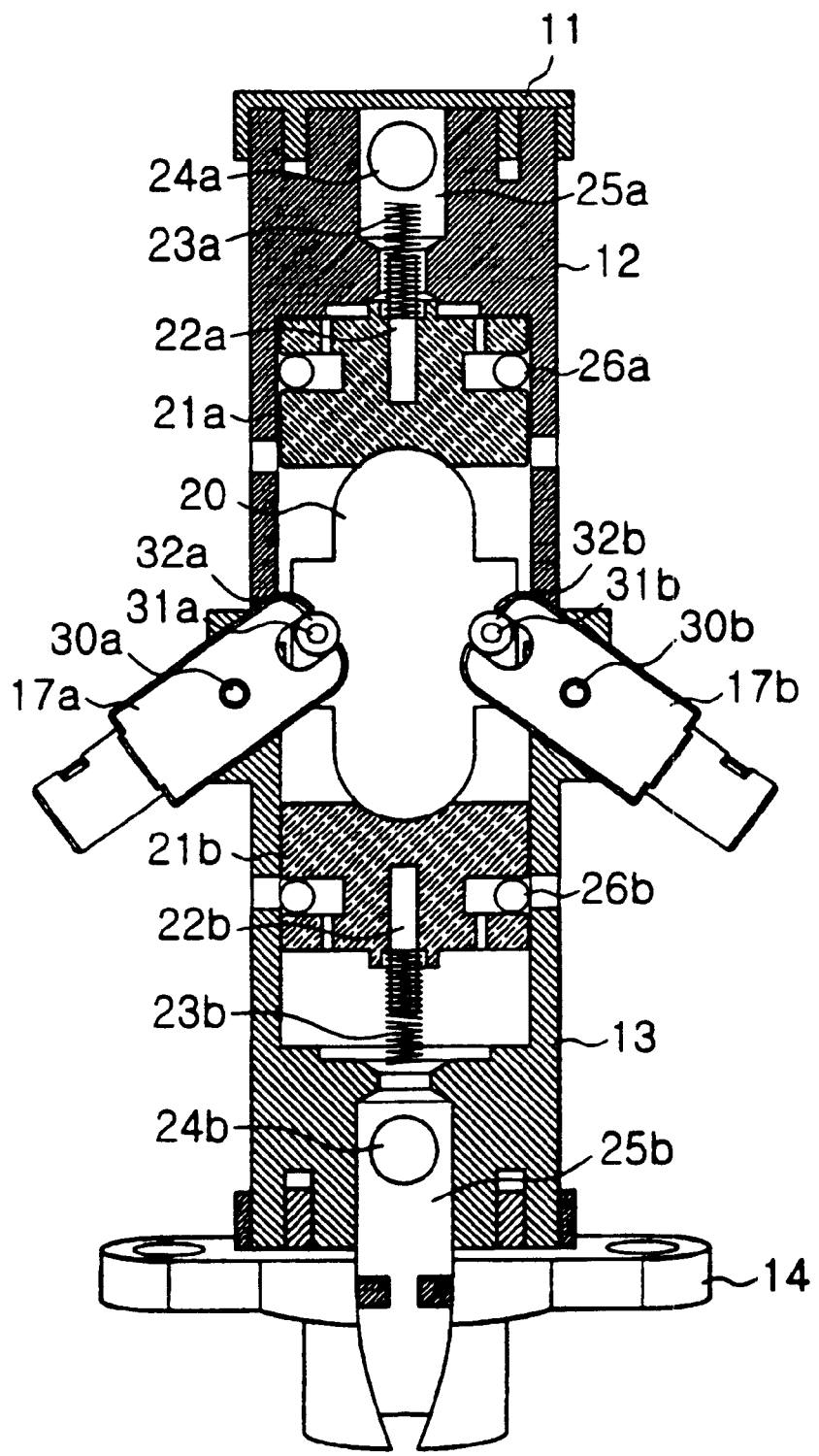
FIG. 3 is a sectional view of the compressed air engine, taken along the line A–A' of FIG. 1.

In the compressed air engine of the present invention, the shuttle 20 and the pair of the pistons 21a and 21b are driven within the interior of the engine body, so that the pair of the wings 3a and 3b can perform the flapping motions. This is illustrated in FIG. 3. FIG. 3 is a sectional view of the compressed air engine, taken along the line A–A' of FIG. 1.

As shown in FIG. 3, the compressed air engine 10 includes: a top member 11; an upper cylinder 12; a lower cylinder 13; and a bottom member 14. A shuttle 20 is accommodated at the middle of the cylinder, and the upper and lower pistons 21a and 21b are accommodated over and under the shuttle 20, in such a manner that the pistons should be able to perform the up/down movements. The upper piston 21a, shuttle 20 and lower piston 21b may be formed in one body, if the one body reciprocates well in the upper and lower cylinders 12 and 13. A pin 22a or 22b and a spring 23a or 23b are secured to each of the pistons 21a and 21b, and at the outer end of each of the springs 23a and 23b, there is installed a bead 24a or 24b, for passing/blocking the compressed air. Further, there are provided hollows 25a and 25b for guiding the beads 24a and 24b respectively.

Arms 17a and 17b are pivotally secured to the lower cylinder by means of securing shafts 30a and 30b respectively. Ends of the arms 17a and 17b are assembled to the shuttle 20, and other ends of the arms 17a and 17b are assembled to the pair of the wings respectively, so that the pair of the wings can perform the flapping motions in accordance with the up/down movements of the shuttle 20.

Figure 4:
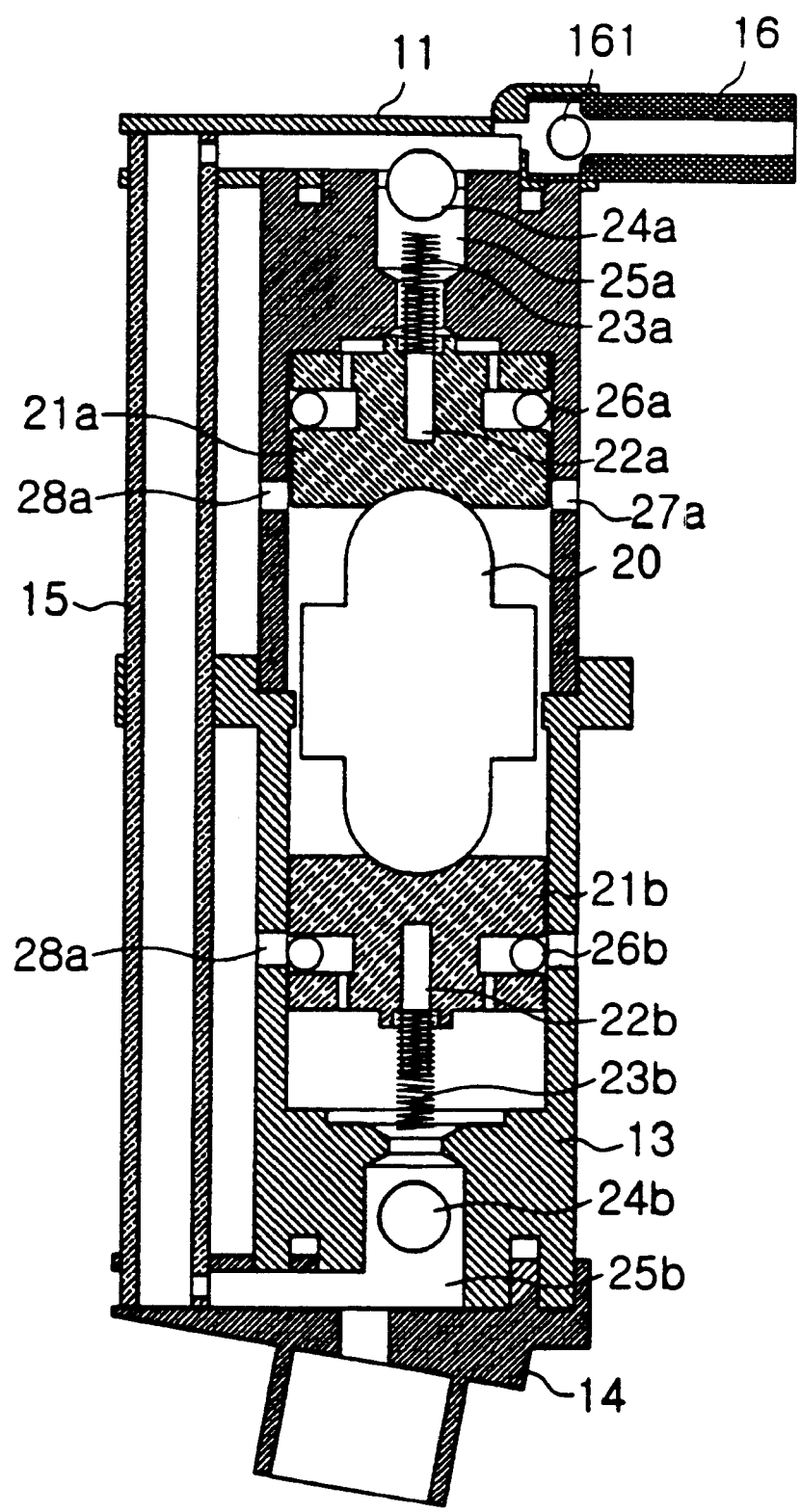
FIG. 4 is a sectional view of the compressed air engine, taken along the line B–B' of FIG. 1.

The compressed air passes through the air inlet 16 to enter into the compressed air container 2. The compressed air thus stored in the compressed air container 2 is discharged to drive the shuttle 20 and the pistons 21a and 21b. This actuation principle is illustrated in FIG. 4. FIG. 4 is a sectional view of the compressed air engine, taken along the line B–B' of FIG. 1.

Thus, the compressed air which has been injected through the air inlet 16 by the air pump (not illustrated) passes through the top member 11, the air pipe 15 and the bottom member 14 to be ultimately stored in the compressed air container 2. At the end of the air inlet 16, there is disposed a bead 161. When the compressed air is injected by the pump, the compressed air is injected while pushing the bead 161. When the pump is not activated, the bead 161 closes the air inlet owing to the internal pressure, so that the compressed air would not be discharged to the outside.

In order that the air inlet can be perfectly closed, the bead 161 should be preferably made of a soft rubber, and this can be easily carried out by those ordinarily skilled in the art.

In a state with the compressed air filled into the compressed air container 2, if the wings are hit once with hand, then the pistons 21a and 21b are activated. That is, if the wings 3a and 3b are hit downward once, then the shuttle 20 moves upward to push the piston 21a upward. Under this condition, the bead 24a which has been closing the air passage is pushed by the spring 23a, so that the compressed air passes through the air pipe 15 and the top member 11 to be introduced into the hollow 25a.

The compressed air which has been introduced into the hollow 25a pushes the piston 21 a downward, and as a result, the shuttle 20 and the piston 21b move downward together. When the piston 21b moves downward, the spring 23b pushes the bead 24b, so that the compressed air moves along the bottom member 14 to be introduced into the hollow 25b. The bottom member can be appropriately adjusted considering the direction of the flying object. This actuation is repeated, and thus, the shuttle 20 and the pistons 21a and 21b perform up/down movements until the compressed air within the compressed air container 2 is exhausted.

Now the structure and the operating principle of the compressed air engine will be described in more detail below.

Figure 5A:
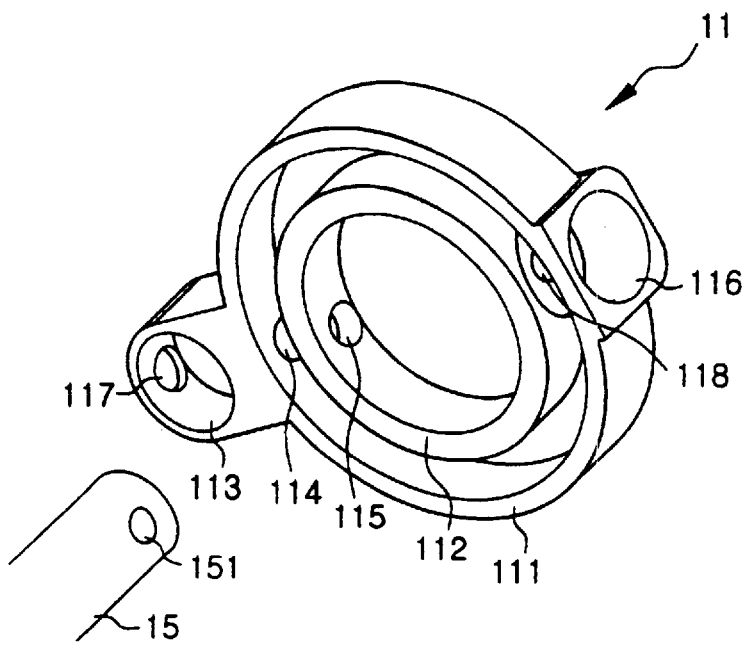
FIG. 5A is a schematic perspective view of the top member 11.
Figure 5B:
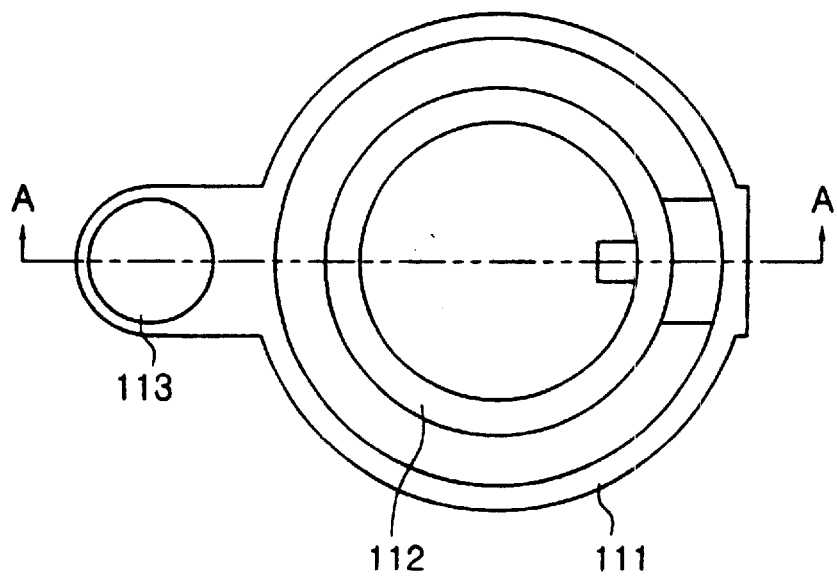
FIG. 5B is its bottom view.
Figure 5C:
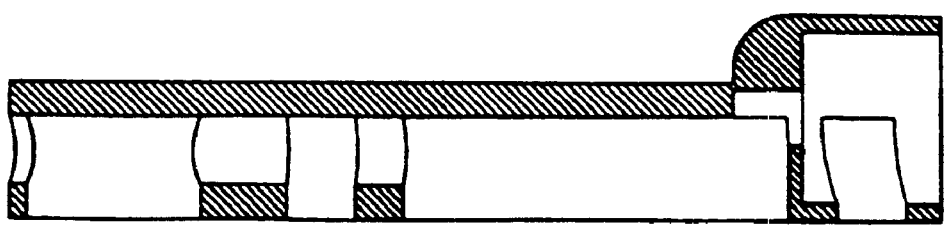
FIG. 5C is its sectional view.
Figure 5D:
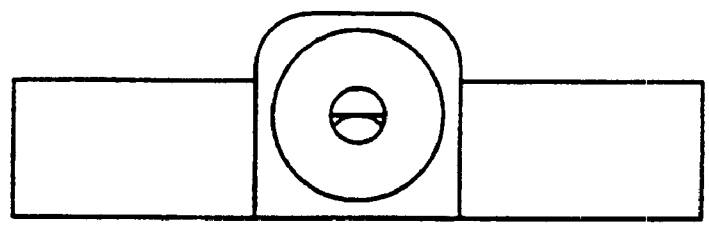
FIG. 5D is its right side view.

FIG. 5A is a schematic perspective view of the top member 11, FIG. 5B is its bottom view, FIG. 5C is its sectional view, and FIG. 5D is its right side view.

As shown in FIG. 5A, the air inlet 16 is assembled into a hole 116 of the top member 11, while the air pipe 15 is assembled into the hole 113 of the top member 11. The upper cylinder 12 is assembled between an outer frame 111 and an inner frame 112, and there are provided holes 114, 115 and 118 so that the air can pass through. The air pipe 15 is provided with a hole 151 so as to make the air pass through, and the hole 151 has to be aligned with the hole 114 on a straight line. There is a hole 117 through which the air does not pass, but which is unavoidably formed during the preparation of the die.

Figure 6:
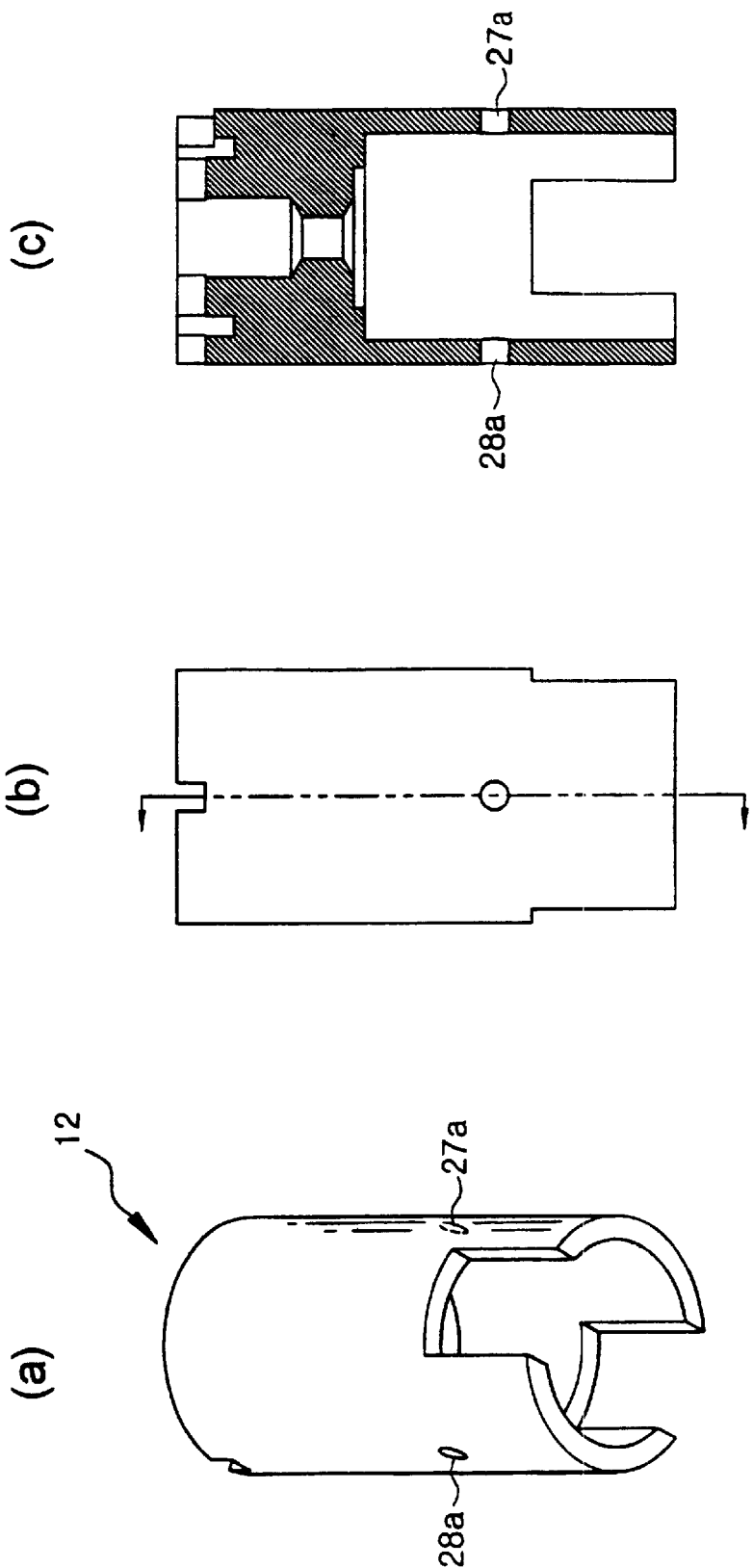
FIG. 6A is a schematic perspective view of the upper cylinder 12.
FIG. 6B is its frontal view.
FIG. 6C is its sectional view.

FIG. 6A is a schematic perspective view of the upper cylinder 12, FIG. 6B is its frontal view, and FIG. 6C is its sectional view. As shown in FIGS. 4 and 6, there are formed two air outlets 27a and 28a on the sidewall of the upper cylinder 12. Around the middle of the piston 21a, there is inserted an O-ring 26a. If the piston 21a comes down to the air outlets 27a and 28a, then the compressed air which has been pushing down the piston 21a is discharged through the air outlets 27a and 28a to the outside.

FIG. 7A is a schematic perspective view of the lower cylinder 13, FIG. 7B is its frontal view, and FIG. 7C is its sectional view.

Figure 7:
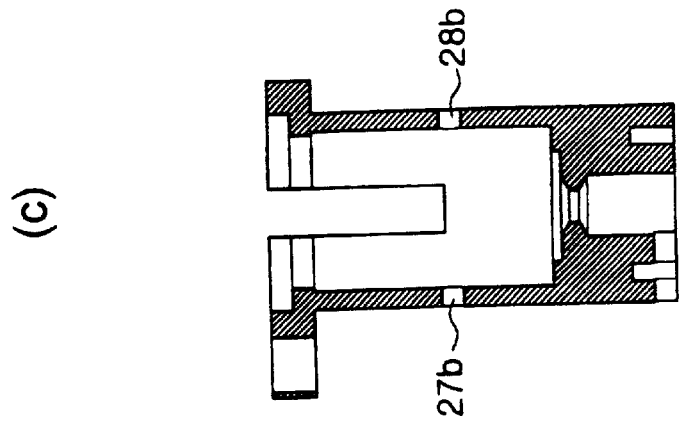
FIG. 7A is a schematic perspective view of the lower cylinder 13.
FIG. 7B is its frontal view.
FIG. 7C is its sectional view.
Figure 7:
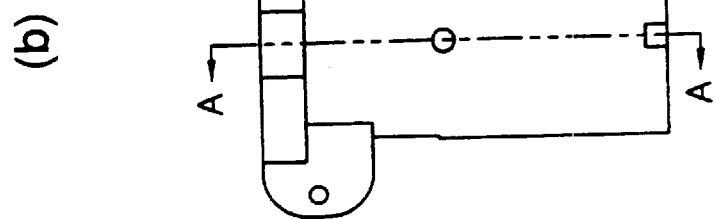
Figure 7:
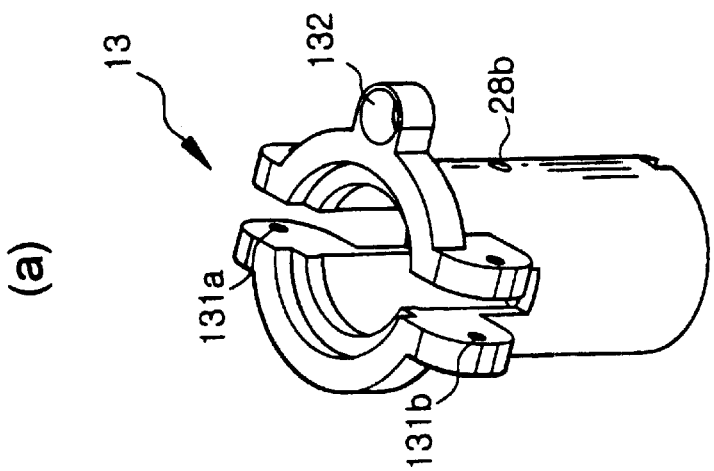

As shown in FIGS. 4 and 7, there are formed two air outlets 27b and 28b on the sidewall of the lower cylinder 13. Around the middle of the piston 21b, there is fitted an O-ring 26b. If the piston 21b comes up to the air outlets 27b and 28b, then the compressed air which has been pushing up the piston 21b is discharged through the air outlets 27b and 28b to the outside.

At the opposite positions of the lower cylinder 13, there are formed holes 131a and 131b through which securing shafts 30a and 30b pass to secure a pair of arms 17a and 17b respectively. Meanwhile, apart by 90 angular degrees from the holes 131a and 131b, there is formed a hole 132 through which the air pipe 15 passes.

Figure 8A:
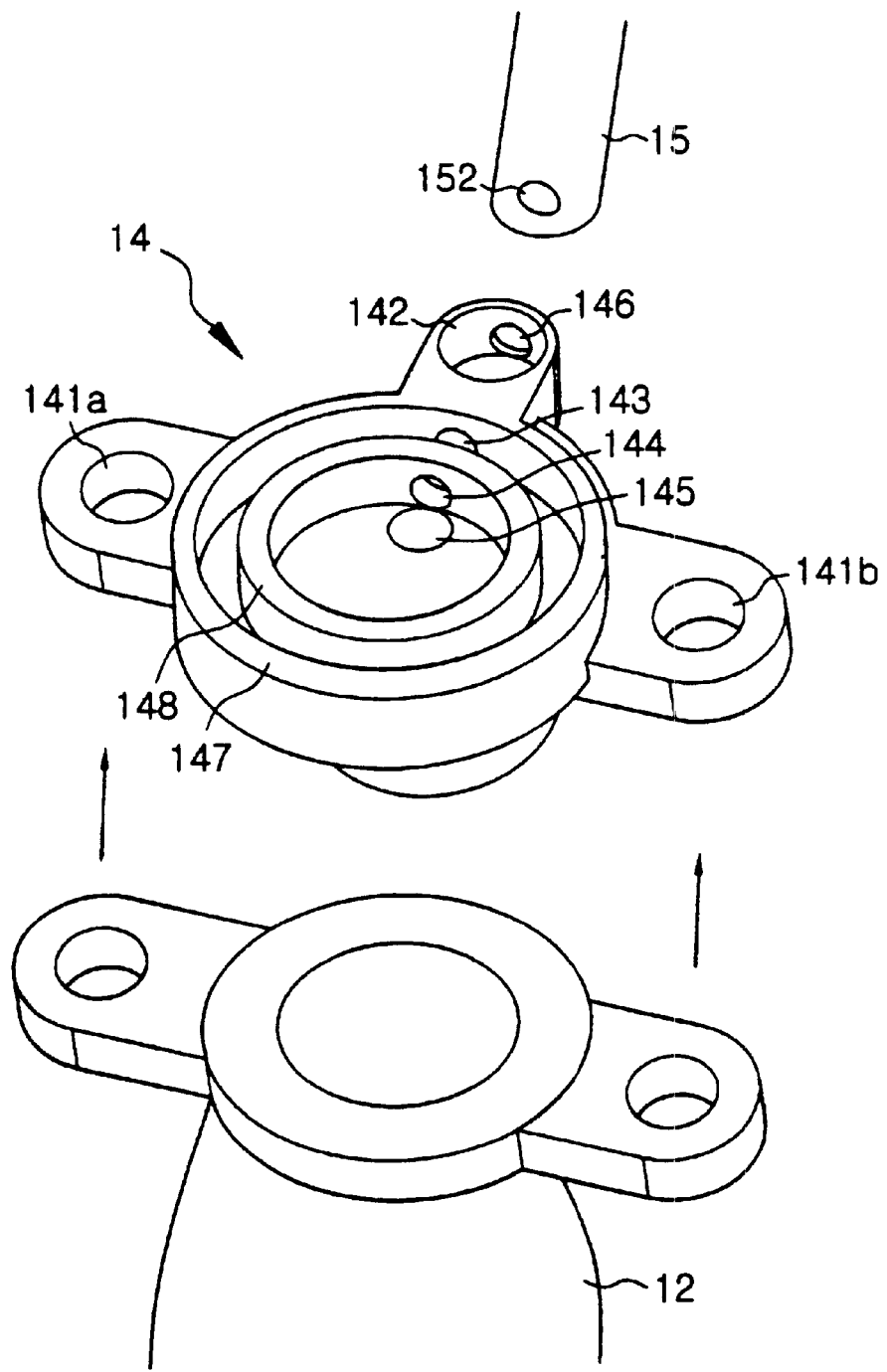
FIG. 8A is a schematic perspective view of the bottom member 14.
Figure 8B:
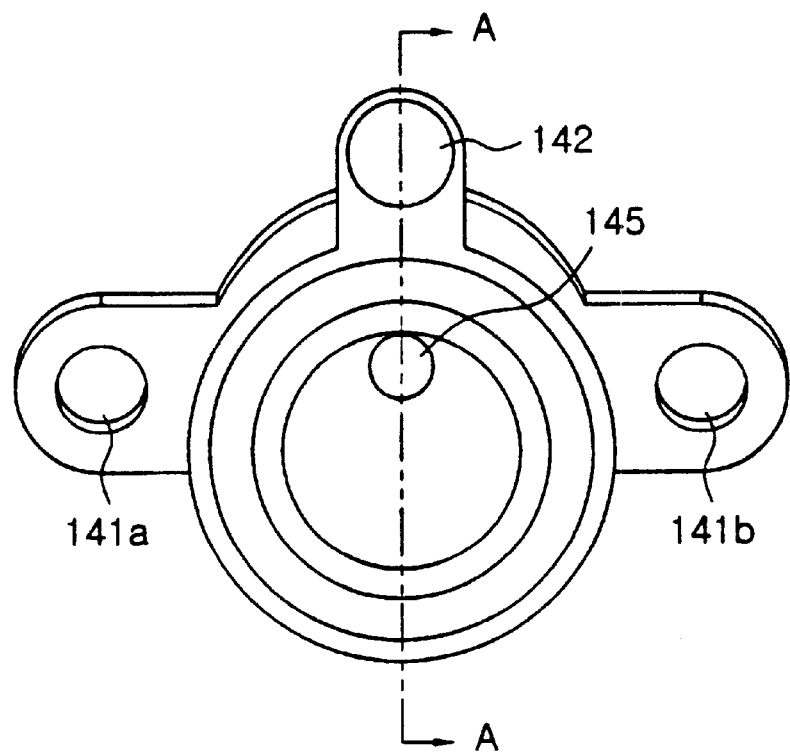
FIG. 8B is its plan view.
Figure 8C:
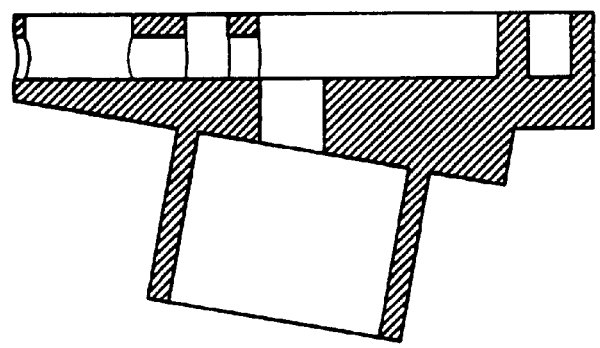
FIG. 8C is its sectional view.

FIG. 8A is a schematic perspective view of the bottom member 14, FIG. 8B is its plan view, and FIG. 8C is its sectional view.

As shown in FIG. 8A, the air pipe 15 is assembled to a hole 142 of the bottom member 14. The lower cylinder 13 is assembled between an outer frame 147 and an inner frame 148, and there are formed holes 143, 144 and 145 through which the air passes. Further, the air pipe 15 is provided with a hole 152 so as to make the air pass through it, and this hole 152 has to be aligned to the hole 143 on a straight line.

There is a hole 146 through which the air does pass, but which is unavoidably formed during the preparation of the die. The compressed air container 2 is assembled to the bottom of the bottom member 14 through its holes 141a and 141b. This can be easily carried out by those ordinarily skilled in the art FIG. 9A is a schematic perspective view of the shuttle 20, FIG. 9B is its frontal view, and FIG. 9C is its plan view.

Figure 9:
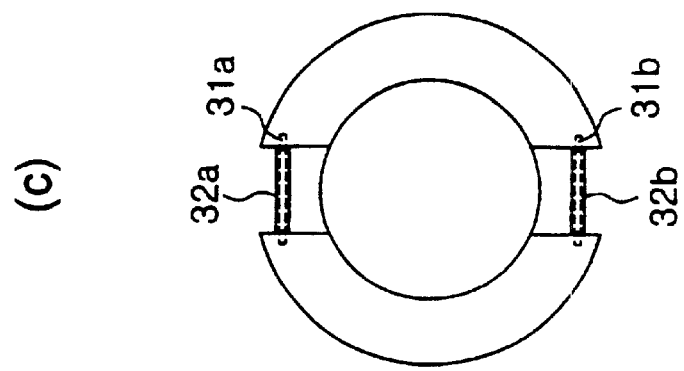
FIG. 9A is a schematic perspective view of the shuttle 20.
FIG. 9B is its frontal view.
FIG. 9C is its plan view.
Figure 9:
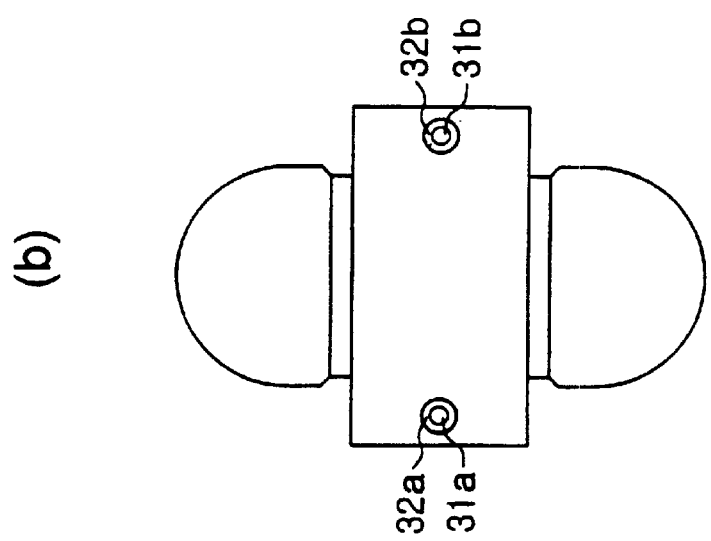
Figure 9:
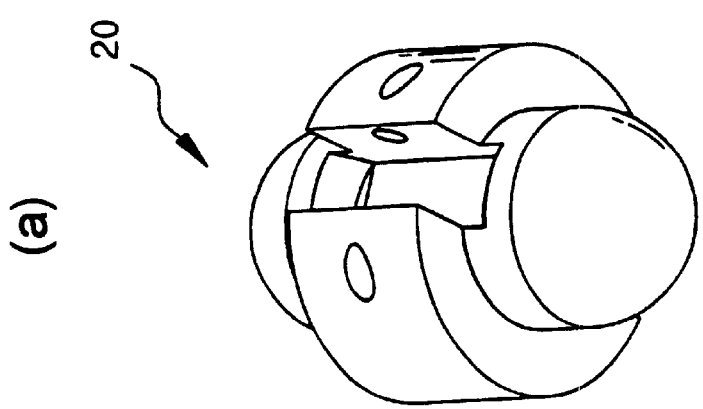

As shown in FIGS. 3 and 9, at the middle of the shuttle 20, there are secured pins 31a and 31b, while idlers 31a and 32b surround the pins 31a and 31b respectively.

A slot 172 of each of the arms 17 is fitted to each of the idlers, so that the arms 17a and 17b can be pivoted around securing shafts 30a and 30b respectively.

FIG. 10A is a schematic perspective view of the piston 21, FIG. 10B is its sectional view, and FIG. 10C is its frontal view.

Figure 10:
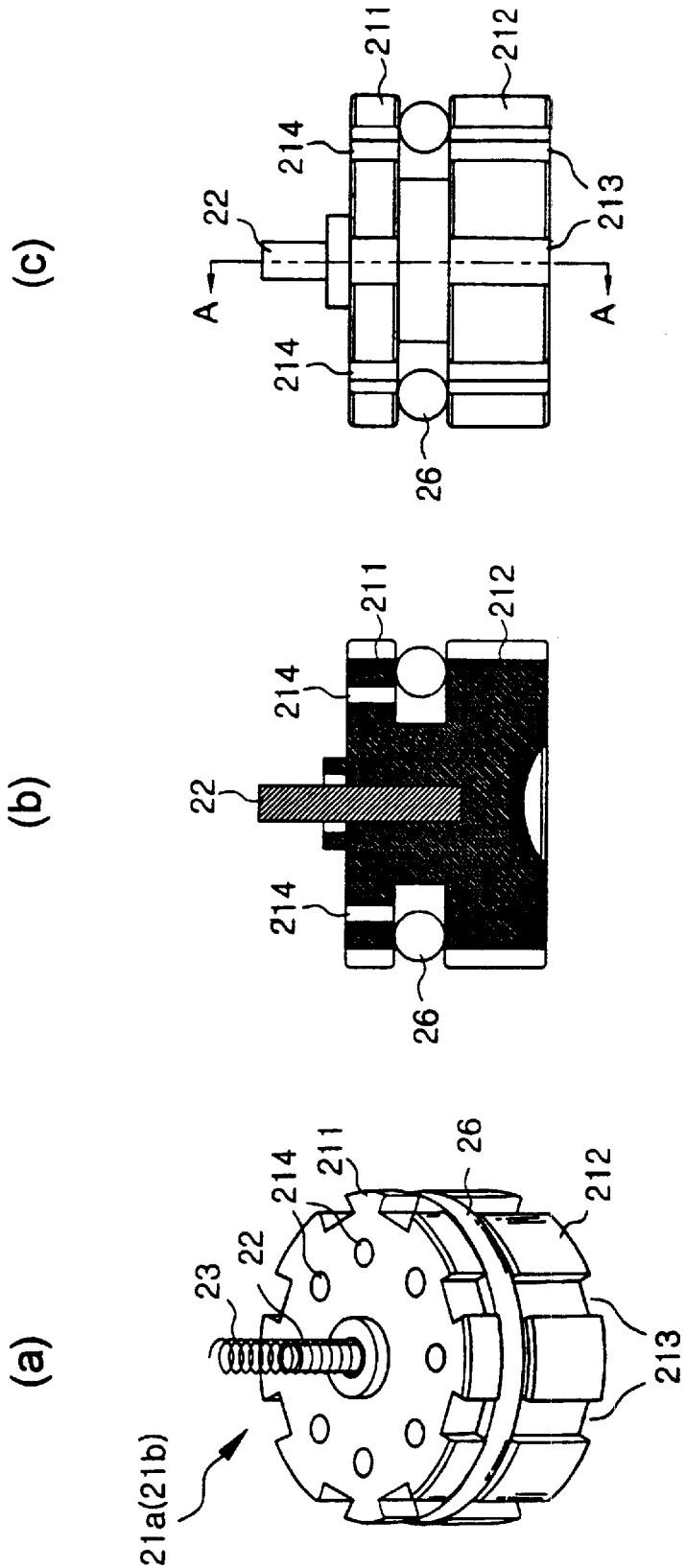
FIG. 10A is a schematic perspective view of the piston 21.
FIG. 10B is its sectonal view.
FIG. 10C is its frontal view.

As shown in FIG. 10, the piston 21 consists of an upper piston portion 211 and a lower piston portion 212, and between the two piston portions, there is installed an O-ring 26. On the top of the piston, there are formed a plurality of holes 214, while on the circumferential surface of the piston, there are formed a plurality of vertical channels 213.

First, when the piston 21a comes down owing to the action of the compressed air, the compressed air exerts a pressure through the plurality of the holes 214 to make the O-ring 26a expanded toward the outside, while the piston 21a comes down. If the piston comes down so as for the O-ring 26a to arrive at the positions of the air outlets 27a and 28a, then the compressed air is discharged through the air outlets 27a and 28a, with the result that the descending of the piston 21a is stopped. At this moment, the piston 21b starts its actuation.

This operation is repeated so that the upper and lower pistons 21a and 21b would perform the up/down movements alternately. As a result, the shuttle 20 performs the up/down movements repeatedly.

Figure 11:
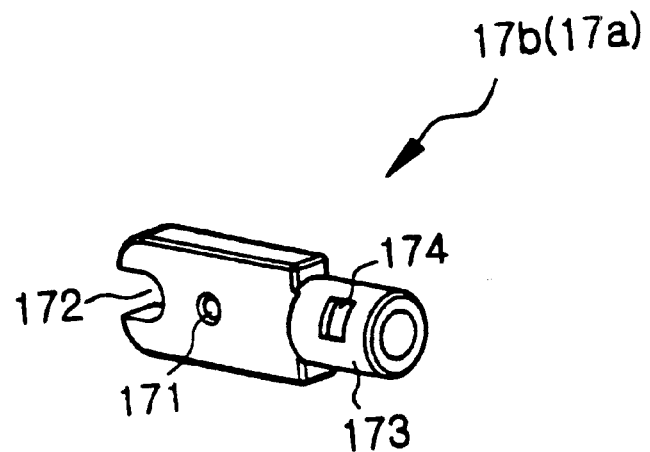
FIG. 11 is a schematic perspective view of one of the arms 17 for connecting the left and right wings respectively.

FIG. 11 is a schematic perspective view of one of the arms 17 for connecting the left and right wings respectively.

As shown in FIGS. 3 and 11, a securing shaft 30 is inserted into a hole 171 of the arm 17, and thus, the arm 17 is pivotally secured to a side of the lower cylinder 13. On an end of the arm 17, there is formed a slot 172 to be assembled around the idler 32. On the other end of the arm 17, there is integrally formed a connecting member 173 for connecting the wing 3 to it, and the connecting member 173 is provided with a rectangular slot 174. The connecting member may be appropriately angled to the arm considering the direction of flying of the flying object. The angle may be preferably in the range of about −50° to about +50° to the arm.

Figure 12:
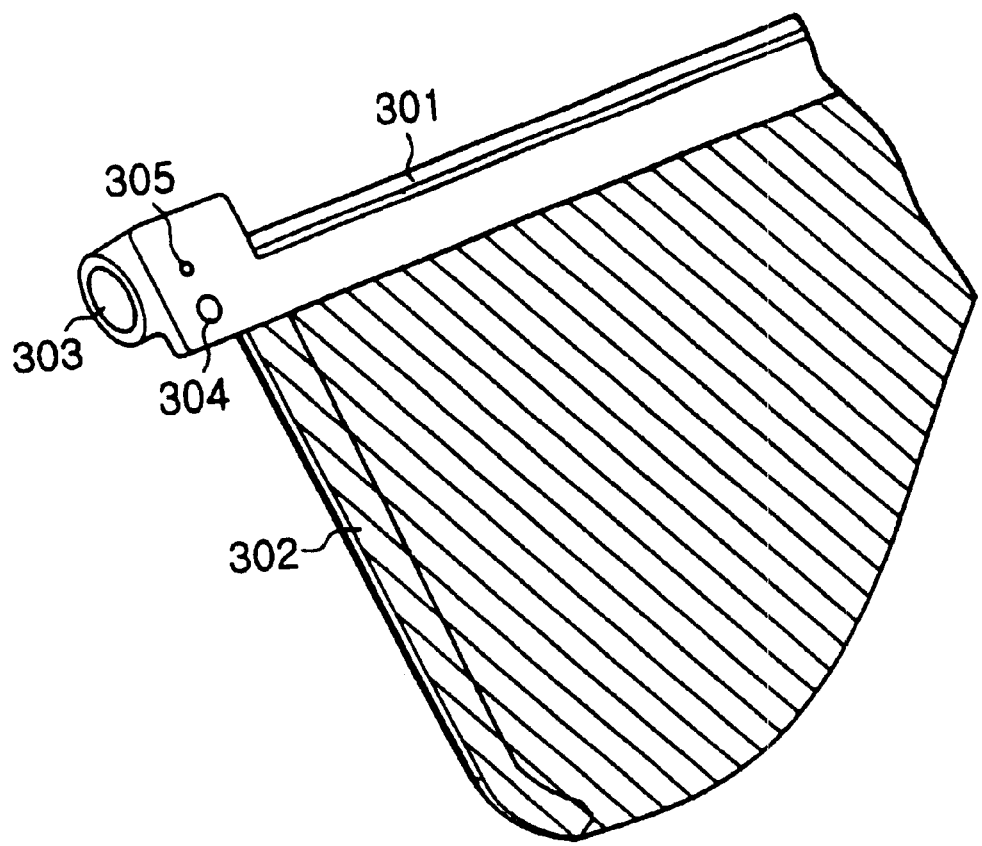
FIG. 12 is a schematic perspective view of a part of the wings 3 to be assembled to the arm 17.

FIG. 12 is a schematic perspective view of a part of the wings 3 to be assembled to the arms 17 respectively.

Figure 13:
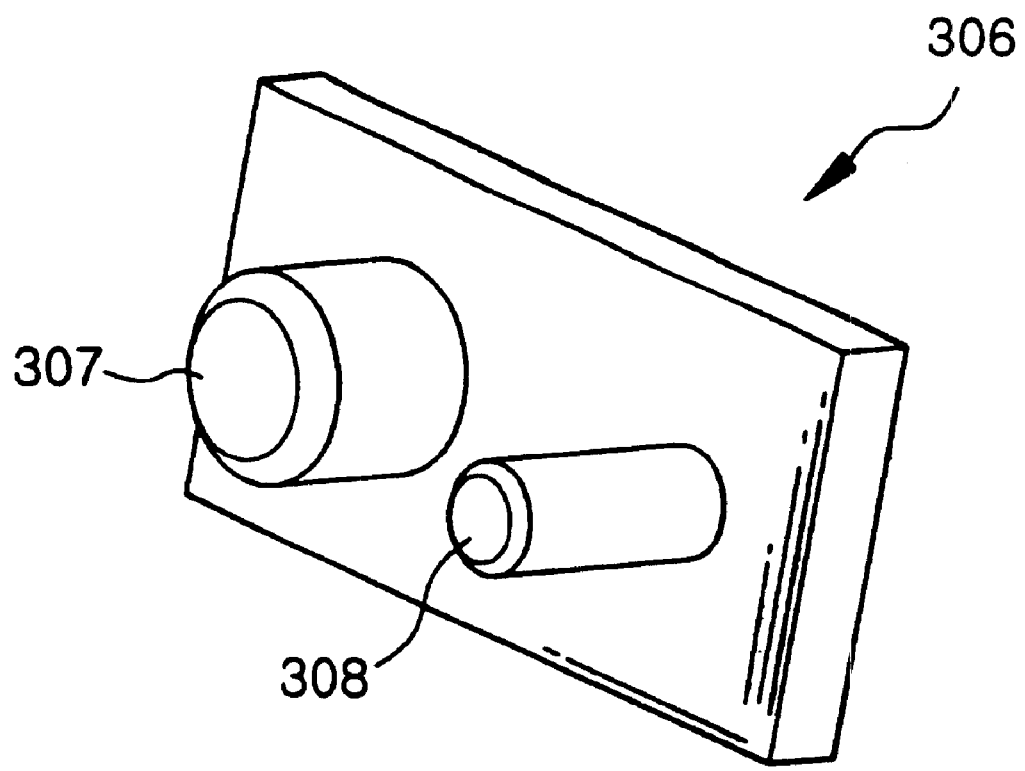
FIG. 13 is a schematic perspective view of the cock 306 as a means for assembling each of the wings 3 to each of the arms 17.

Wing frames 301 and 302 are integrally formed, and the connecting member 173 of the arm 17 is inserted into a hole 303 of the wing 3. If the connecting member 173 is inserted into the hole 303, the connecting member 173 is secured by using a cock 306 of FIG. 13.

The cock 306 has a fixed pin 307 and a twisting pin 308, the fixed pin 307 of the cock 306 is tightly coupled to a hole 304 of the wing 3, while the twisting pin 308 passes through a hole 305 to be coupled to the rectangular slot 174. The rectangular slot 174 has a larger cross sectional area than that of the twisting pin 308, and therefore, when the wing 3 performs the flapping motions, it also performs twisting motions within an angular range of about 40°.

Referring to FIGS. 3 and 4, the beads 24a and 24b serves the role of closing/opening the air passages, and therefore, they should be preferably made of a soft rubber. This can be easily carried out by those ordinary skilled in the art.

The pair of the wings which are attached to the compressed air engine are designed such that they should be able to perform the flapping motions within an angular range of about 70°. Further, together with the flapping motions, the wings perform the twisting motions within an angular range of about 40°.

According to the present invention as described above, a compressed air engine is provided in which a compressed air is injected into a compressed air container, and the compressed air is discharged at a certain discharge rate, so that a pair of wings can perform the flapping motions. Further, there is provided a flying object utilizing the compressed air engine, in which the pair of the wings are assembled to the compressed air engine in a simple manner, a head part of a desired shape is assembled also in a simple manner, and an air pump can be used to inject the air into the compressed air engine.

In the above, the present invention was described based on the specific preferred embodiments and the attached drawings, but it should be apparent to those ordinarily skilled in the art that various changes and modifications can be added without departing from the spirit and scope of the present invention, which will be defined in the appended claims.

What is claimed is:

1. A compressed air engine for actuating a first and a second wing in a flapping motion, comprising:
   a container for holding compressed air;
   a first and a second piston positioned within an internal volume of the compressed air engine and being in fluid communication with the container on an alternating basis so that the first and second pistons move reciprocally within the internal volume in response to the compressed air; and
   a shuttle positioned in the internal volume between the first and second pistons so that the shuttle reciprocates with the first and second pistons and the shuttle transmits the reciprocating movement of the first and second pistons to the first and second wings thereby actuating the first and second wings.

2. A flying object comprising a first and a second wing, a container for holding compressed air, and a compressed air engine, the compressed air engine comprising:
   a first and a second piston positioned within an internal volume of the compressed air engine and being in fluid communication with the container on an alternating basis so that the first and second pistons move reciprocally within the internal volume in response to the compressed air; and
   a shuttle mechanically coupled to the first and second wings and positioned in the internal volume between the first and second pistons so that the shuttle reciprocates with the first and second pistons and thereby actuates the first and second wings.

\* \* \* \* \*